(12) United States Patent
Theodore

(10) Patent No.: US 8,702,986 B2
(45) Date of Patent: Apr. 22, 2014

(54) METHOD OF REMOVING HEAVY METALS IN SOILS AND WATER

(75) Inventor: Marcus G. Theodore, Salt Lake City, UT (US)

(73) Assignee: Earth Renaissance Technologies, LLC, Salt Lake City, UT (US)

(*) Notice: Subject to any disclaimer, the term of this patent is extended or adjusted under 35 U.S.C. 154(b) by 299 days.

(21) Appl. No.: 13/200,968

(22) Filed: Oct. 5, 2011

(65) Prior Publication Data

US 2012/0208261 A1 Aug. 16, 2012

Related U.S. Application Data

(60) Provisional application No. 61/463,070, filed on Feb. 11, 2011.

(51) Int. Cl.
*C02F 3/32* (2006.01)
*B09C 1/08* (2006.01)

(52) U.S. Cl.
USPC ........... 210/602; 210/611; 210/631; 210/912; 405/128.5

(58) Field of Classification Search
USPC ......... 210/602, 610, 611, 631, 908, 909, 912, 210/913; 405/128.45, 128.5
See application file for complete search history.

(56) References Cited

U.S. PATENT DOCUMENTS

| | | | | |
|---|---|---|---|---|
| 3,790,370 A | * | 2/1974 | Lalancette | 210/721 |
| 3,992,294 A | * | 11/1976 | Scharf et al. | 210/700 |
| 5,156,746 A | * | 10/1992 | Maree et al. | 210/712 |
| 5,700,107 A | * | 12/1997 | Newton | 405/128.75 |
| 2002/0158014 A1 | * | 10/2002 | Yamasaki et al. | 210/631 |
| 2010/0193436 A1 | * | 8/2010 | Ruehr et al. | 210/636 |
| 2010/0230363 A1 | * | 9/2010 | Gong et al. | 210/721 |
| 2011/0243665 A1 | * | 10/2011 | Theodore et al. | 405/128.75 |

FOREIGN PATENT DOCUMENTS

| | | | |
|---|---|---|---|
| JP | 2000-218261 A | * | 8/2000 |
| JP | 2005-262039 A | * | 9/2005 |

OTHER PUBLICATIONS

M. Lambert, B.A. Leven and R.M. Greent, New Methods of Cleaning Up Heavy Metal in Soils and Water, Env. Science and Tech. Briefs for Citizens, Kansas State University, (2003).

* cited by examiner

*Primary Examiner* — Fred Prince
(74) *Attorney, Agent, or Firm* — Marcus G. Theodore

(57) ABSTRACT

A method for sulfurous acid leaching of heavy metals from soils into a contaminated water fraction for subsequent precipitation with alkaline and nutrient reagents for filtration removal to provide a metal free soil and reclaimed water suitable for raising crops and open stream discharge.

7 Claims, 2 Drawing Sheets

METHOD OF REMOVING HEAVY METALS IN SOILS AND WATER

RELATED APPLICATIONS

This application claims priority based on provisional patent application No. 61/463,070 filed Feb. 11, 2011 entitled "Method of Removing Heavy Metals in Soils and Water."

BACKGROUND OF THE INVENTION

1. Field

This invention pertains to soil and water heavy metals remediation. In particular, it provides a method for the onsite production of sulfur dioxide/sulfurous acid leaching of heavy metals from soils into a contaminated water fraction for subsequent precipitation with alkaline and nutrient reagents for filtration removal to provide a metal free soil and reclaimed water suitable for raising crops and open stream discharge.

2. State of the Art

The article entitled "New Methods of Cleaning up Heavy Metal in Soils and Water" by M. Lambert, B. A. Leven, and R. M Green published in Environmental Science and Technology Briefs for Citizens by Kansas State University, states:

"Introduction

At many sites around the nation, heavy metals have been mined, smelted, or used in other industrial processes. The waste (tailings, smelter slag, etc.) has sometimes been left behind to pollute surface and ground water. The heavy metals most frequently encountered in this waste include arsenic, cadmium, chromium, copper, lead, nickel, and zinc, all of which pose risks for human health and the environment. They typically are spread out over former industrial sites and may cover acres of land. FIG. 1 shows one such site in southwestern Missouri, near the city of Joplin. Here, mine spoils (locally called chat) cover much of the open space inside the city, and contain high levels of lead, zinc, and cadmium. Heavy metal contamination can be carried with soil particles swept away from the initial areas of pollution by wind and rain. Once these soil particles have settled, the heavy metals may spread into the surroundings, polluting new areas. Cleanup (or remediation) technologies available for reducing the harmful effects at heavy metal-contaminated sites include excavation (physical removal of the contaminated material), stabilization of the metals in the soil on site, and the use of growing plants to stop the spread of contamination or to extract the metals from the soil (phytoremediation).

Excavation

Excavation and physical removal of the soil is perhaps the oldest remediation method for contaminated soil. It is still in use at many locations, including residential areas contaminated with lead in southwestern Missouri. Advantages of excavation include the complete removal of the contaminants and the relatively rapid cleanup of a contaminated site (Wood, 1997). Disadvantages include the fact that the contaminants are simply moved to a different place, where they must be monitored; the risk of spreading contaminated soil and dust particles during removal and transport of contaminated soil; and the relatively high cost. Excavation can be the most expensive option when large amounts of soil must be removed or disposal as hazardous or toxic waste is required (see Table 1).

TABLE 1

Comparative costs for different types of heavy metal soil remediation (Schnoor, 1997)

| Type of Remediation | Cost/cubic meter | Time Required |
|---|---|---|
| Excavation and removal | $100-$400 | 6-9 months |
| In situ fixation (including soil amendments | $90-$200 | 6-9 months |
| Phytoextraction | $15-40 | 18-60 months |

Stabilizing Metals in the Soil

Heavy metals can be left on site and treated in a way that reduces or eliminates their ability to adversely affect human health and the environment. This process is sometimes called stabilization. Eliminating the bioavailability of heavy metals on site has many advantages over excavation. One way of stabilizing heavy metals consists of adding chemicals to the soil that cause the formation of minerals that contain the heavy metals in a form that is not easily absorbed by plants, animals, or people. This method is called in situ (in place) fixation or stabilization. This process does not disrupt the environment or generate hazardous wastes. Instead, the heavy metal combines with the added chemical to create a less toxic compound. The heavy metal remains in the soil, but in a form that is much less harmful.

One example of in situ fixation of heavy metals involves adding phosphate fertilizer as a soil amendment to soil that has high amounts of the heavy metal lead. Chemical reactions between the phosphate and the lead cause a mineral to form called lead pyromorphite. Lead pyromorphite and similar minerals called heavy metal phosphates are extremely insoluble. This means the new minerals cannot dissolve easily in water (Lambert et al., 1997). This has two beneficial effects. The minerals (and the heavy metals) cannot be easily spread by water to pollute streams, lakes, or other groundwater. Also the heavy metal phosphates are less likely to enter the food chain by being absorbed into plants or animals that may eat soil particles. Table 1 shows the cost of treating the soil by in situ fixation may be about half the cost of excavation and disposal of heavy metal contaminated soil. This method is relatively rapid and takes about the same amount of time as excavation.

Use of Plants

Growing plants can help contain or reduce heavy metal pollution. This is often called phytoremediation (EPA, 1988). It has the advantage of relatively low cost and wide public acceptance (Schnoor, 1997). It can be less than a quarter of the cost of excavation or in situ fixation. Phytoremediation has the disadvantage of taking longer to accomplish than other treatment. Plants can be used in different ways. Sometimes a contaminated site is simply revegetated in a process called phytostabilization. The plants are used to reduce wind and water erosion that spread materials containing heavy metals. In one example, grass or tree buffers could reduce sediment loss from the chat piles at a contaminated site in Galena, Kans., anywhere from 18% to 25% (Green, et al. 1997). If all of the ground could be revegetated, sediment loss could be cut by approximately 70%. However, it would be necessary to find plants that could tolerate high levels of heavy metals. FIG. 2 shows a series of several revegetation test plots on the chat piles in Galena, Kans.

Another way plants can be used to clean up heavy-metal contaminated soil is called phytoextraction. Some plant species can take up heavy metals and concentrate them in their tissue. The plants can be harvested and the contaminated plant material disposed of safely. Sometimes soil amendments are added to the soil to increase the ability of the plants to take up the heavy metals. One type of plant used for this purpose is called Indian mustard. This plant has been used to extract lead from soil and reduce lead contamination at various contaminated sites. Other plants that may be used for phytoextraction include alfalfa, cabbage, tall fescue, juniper, and poplar trees.

Another way plants are used to treat heavy metal contamination is called rhizofiltration (EPA, 2000). In this method, heavy metals are removed directly from water by plant roots. The plants are grown directly in water or in water rich materials such as sand, using aquatic species or hydroponic methods. In field tests sunflowers on floating rafts have removed radioactive metals from water in ponds at Chernobyl, and other plants removed metals from mine drainage flowing through diversion troughs (EPA, 2000). Plants used for phytoextraction may accumulate high concentrations of metals. Fences or other ways to limit access to people and animals, and disposal of plant matter as special waste is sometimes necessary.

Conclusions

During the 1990's, new methods have been developed to clean up heavy metal-contaminated soil. The expensive process of excavating and disposing contaminated soil has been augmented with new methods that treat the soil in place. In situ fixation is a process that creates new chemical compounds in which heavy metals are much less available to living things. This on-site cleanup is less disruptive to people's lives and to the environment compared to excavating and disposing contaminated soils elsewhere. Phytoremediation uses plants by several methods to contain or clean up heavy metals. Phytoremediation has the benefit of being a relatively low-cost, natural solution to an environmental problem. More information on these and other new cleanup methods for contaminated soils and water is on the internet at many sites, including <http://www.cluin.org/>."

The method described below provides a hybrid chemical/phytoextraction/phytoremediation/phytostabilization method to clean up heavy metals from contaminated soils and water.

SUMMARY OF THE INVENTION

The method comprises chemically treating soil and waters containing heavy metals with sulfur dioxide to acid leach the heavy metals from the soils into solution. Sulfur dioxide in solution forms sulfurous acid, ($H_2SO_3$), which dissociates to produce $H^+$, bi-sulfite ($HSO_3^-$), sulfite ($SO_3^-$), and free $SO_2$ species in solution, all hereinafter referred to as sulfurous acid. The leachate pH may be lowered to kill any bacteria and pathogens for safer handling and prevent bacterial contamination of surrounding waters.

The soils are treated with sufficient $SO_2$ to acid leach heavy metals adhering thereto and are then allowed to drain for collection in the liquid fraction. Sulfur dioxide produces bi-sulfite ($HSO_3^-$) and sulfite ($SO_3^-$) compounds, which act as scavenger molecules to remove excess oxygen and oxidizing chemicals by acting as a reducing agent to inactivate many unwanted pharmaceuticals and chemicals, such as perchlorates, and chromium VI, which may adversely affect plant and animal growth. Perchlorates are reduced to chlorides and chromium VI is reduced to chromium III for subsequent removal as an hydroxide.

Sulfur dioxide has lone electron pairs, allowing it to act as a Lewis base. Additionally it can act as a Lewis acid. The dissolved $SO_2$ gaseous content varies with temperature. For example, the maximum grams/liter of dissolved sulfur dioxide in water at 20 degrees C. is 106.4 gm/L. It is 55.4 gm/L at 40 degrees. It is 32.5 gm/L at 60 degrees, and 21.3 gm/L at 80 degrees. Consequently, sulfurous acid treated waters with free $SO_2$/sulfurous acid/bi-sulfite/sulfite present in solution at a low pH forms a complex liquid/gas/solid phase chemistry system where reactions are difficult to describe and quantify exactly.

The pH selected for acid leaching of heavy metals may also depend upon the presence of microbes in the soil. Certain microbes eat mining and other waste releasing heavy metals. Nowadays the microbial ore leaching with so-called 'lean ores' represents more than 10% of the total production of copper in the USA alone. The biomethod of extraction for copper from copper ore) uses *Thiobacillus ferrooxidans* bacteria. The bacteria change the copper in the ore into a form that can be readily dissolved by the acid. The dissolved copper is then recovered and subjected to electrolysis to produce unprocessed metal. Bioleaching is one of several applications within biohydrometallurgy molybdenum, gold, and cobalt. To encourage the growth of *Acidthiobacillus ferrooxidans*, the pH is adjusted between 1.3 and 4.5 in basal salt medium so that the bacteria derives its biosynthetic requirements by autotrophy using carbon from atmospheric carbon dioxide.

Most species of *Thiobacilli* are acidotolerant, some even extremely acidotolerant and acidophilic. Some grow best at pH 2 and may grow at pH 1 or even at pH 0.5. Most species are tolerant against heavy metal toxicity. *Thiobacilli* are chemolithoautotrophs, that means $CO_2$ may be the only source of carbon and they derive their energy from a chemical transformation of inorganic matter. All *Thiobacilli* oxidize sulfur or sulfur compounds to sulfate or sulfuric acid.

Several species of fungi can be used for bioleaching. Fungi can be grown on many different substrates, such as electronic scrap, catalytic converters, and fly ash from municipal waste incineration. Experiments have shown that two fungal strains (*Aspergillus niger, Penicillium simplicissimum*) were able to mobilize Cu and Sn by 65%, and Al, Ni, Pb, and Zn by more than 95%. *Aspergillus niger* can produce some organic acids such as citric acid This form of leaching does not rely on microbial oxidation of metal, but rather uses microbial metabolism as source of acids which directly dissolve the metal.

To promote the growth of these species, the pH is thus set to promote their growth for acid leaching or secondary polishing to further remove arsenic, selenium, mercury, and nitrates.

Heavy metals are acid leached from the contaminated soil into the aqueous fraction, as micro nutrients to promote plant growth, or for chemical precipitation as heavy metal hydroxides for filtration removal from the aqueous fraction. This leaves heavy metals-free separated water suitable for open water discharge. Some non-heavy metals, such as selenium, also co-precipitate with metal hydroxides; all will hereinafter be referred to as "metal hydroxides".

Generally, the oxides of metals are basic and the oxides of non-metals are acidic because of the following reaction:

Metal Oxide: $Na_2O(s)+H_2O(l) \Rightarrow 2Na^+(aq)+OH^-(aq)$

Non-metal Oxide: $CO_2(g)+H_2O(l) \Rightarrow H_2CO_3(aq) \Rightarrow HCO_3^-(aq)+H^+(aq)$ However, some metals are amphoteric and can act as either acids or bases and include metals such as Al, Cr, Zn. These amphoteric metals, as shown below, form different complexes at differing pHs, depending on the hydrogen and hydroxide concentrations.

With acid Al, Cr, Zn dissolve forming salts and releasing hydrogen gas $2Al(s)+6H^+(aq) \rightarrow Al^{3+}(aq)+3H_2(g)$ 2Cr(s)+6H⁺(aq)→2Cr³⁺(aq)+3H₂(g)
Zn(s)+2H⁺(aq)→Zn²⁺(aq)+H₂(g)

With bases they dissolve forming complex ions and hydrogen gas

2Al(s)+2OH⁻(aq)+6H₂O(l)→2[Al(OH)₄]⁻(aq)+3H₂(g)
2Cr(s)+2OH⁻(aq)+6H₂O(l)→2[Cr(OH)₄]⁻(aq)+3H₂(g)
Zn(s)+2OH⁻(aq)+2H₂O(l)→[Zn(OH)₄]²⁻(aq)+H₂(g)

Their amphoteric metal hydroxides dissolve with acid forming a salt and water.

Al(OH)₃(s)+6H⁺(aq)→Al³⁺(aq)+3H₂O(l)
Cr(OH)₃(s)+6H⁺(aq)→Cr³⁺(aq)+3H₂O(l)
Zn(OH)₂(s)+2H⁺(aq)→Zn²⁺(aq)+2H₂O(l)

Their amphoteric metal hydroxides dissolve with a base forming complex ions

Al(OH)₃(s)+OH⁻(aq)→[Al(OH)₄]⁻(aq)
Cr(OH)₃(s)+OH⁻(aq)→[Cr(OH)₄]⁻(aq)
Zn(OH)₂(s)+2OH⁻(aq)→[Zn(OH)₄]²⁻(aq)

Their amphoteric metal oxides found in soils dissolve with sulfurous acid forming salts and water:

Al₂O₃(s)+6H⁺(aq)→2Al³⁺(aq)+3H₂O(l)
Cr₂O₃(s)+6H⁺(aq)→2Cr³⁺(aq)+3H₂O(l)
ZnO(s)+2H⁺(aq)→Zn²⁺(aq)+H₂O(l)

At elevated pH, these amphoteric metal oxides dissolve forming complex ions:

Al₂O₃(s)+2OH⁻(aq)+3H₂O(l)→2[Al(OH)₄]⁻(aq)
Cr₂O3(s)+2OH⁻(aq)+3H₂O(l)→2[Cr(OH)₄]⁻(aq)
ZnO(s)+2OH⁻(aq)+H₂O(l)→[Zn(OH)4]²⁻(aq)

Thus, the heavy metals present in the SO₂ treated liquid fraction can be removed as metal hydroxides precipitates for filtration removal as the pH is elevated. The pH required is dependent upon the metals to be removed.

Most metal hydroxides are insoluble. Some such as Ca(OH)₂, Mg(OH)₂, Fe(OH)₂, Al(OH)₃ etc are sparingly soluble. However, alkali metal hydroxides Ca(OH)₂, KOH, and NaOH are very soluble, making them strong bases. When dissolved, these hydroxides are completely ionized. Since the hydroxide concentration, [OH⁻], is an integrated property of the solution, the solubility of metal hydroxide depends on pH, pOH or [OH⁻].

Alkali metal hydroxides LiOH, NaOH, KOH, CsOH are soluble, and their solutions are basic. Hydroxides of alkali earth metals are much less soluble. For example, quicklime (CaO) reacts with water to give slaked lime, which is slightly soluble.

For the amphoteric metal hydroxides dissolving as the pH is raised above their optimal insolubility pH, the pH required may vary from the theoretical based on the presence of other compounds present in the soil so field testing is usually required to determine the optimal solubility for precipitating a given metal from different soils. For example, the following are amphoteric:

| Metal | Optimal theoretical pH | Amphoteric |
|---|---|---|
| Cu⁺² | 8.2 | yes pH 8-12 |
| Ni⁺ | 10 | yes 10-12 |
| Pb⁺ | 8.9 | yes 8.9-10.6 |
| Cd⁺ | 10.5 | yes 10.5-12 |
| Cr⁺², ³ | 8.5 | yes 8.5-12 |
| Zn+2 | 8.5 | yes 8.5-11.8 |
| Ag+ | 12. | |

Thus most metal hydroxides are removed by raising the pH from 6.8 to 8.6. For those heavy metals requiring a higher pH, the pH may be sequentially raised in different precipitation steps resulting in metal free filtrate. For example, at higher pH levels, chromium and possibly iron and aluminum become more soluble as Fe(OH)₄⁻ or Al(OH)₄⁻ or Cr(OH)₄⁻ ions. They therefore are removed at the pH at which they precipitate before the pH is then raised higher to remove other heavy metal hydroxides.

After sulfur dioxide-treatment, the resultant liquid fraction is then neutralized with an alkaline reagent, such as ammonium hydroxide, lime or calcium carbonate to inactivate the biocidal properties of the sulfurous acid and raise the pH to that suitable for precipitating out the heavy metals for filtration removal. The heavy metal contents of wastewaters can be effectively removed to acceptable levels by precipitating the metal in an insoluble form. Heavy metals are typically precipitated from wastewater as: hydroxides, sulfides or sometime sulfates, and carbonates. Metal co-precipitation during flocculation with iron or aluminum salts is also possible for some metals (e.g., arsenic). Arsenic is removed by co precipitation with FeCl₃ when a Fe(OH)₃ floc is formed. The effluent concentration is 0.005 ppm. Cadmium is removed by co precipitation at pH 6.5 with FeCl3 when a Fe(OH)₃ floc is formed. The effluent concentration is 0.008 ppm. Mercury can also be removed by co-precipitation with FeCl₃ when a Fe(OH)₃ floc is formed. The effluent concentration is 0.0005 to 0.005 ppm. Alternatively, mercury can be removed by co-precipitation with alum. The effluent concentration is 0.001 to 0.01 ppm.

If high levels of bicarbonates are present in the water fraction, some metals (lead, cadmium, nickel) form insoluble carbonates that can be used in carbonate precipitation and filtration removal before hydroxide precipitation. These insoluble metal bicarbonates are thus removed before sulfurous acid treatment. The pH required for lead carbonate removed is between 7.5 and 8.5, providing an effluent concentration comparable to that obtained through hydroxide precipitation at high pH.

Sulfurous acid leaching also has the advantage of adding sulfates (after reduction) to the treated water fraction aiding in heavy metals precipitation. Barium can be removed by precipitation as sulfate, by adding any sulfate ion source. The solubility of barium sulfate is 1.4 ppm. Even lower residual barium concentrations (0.5 ppm) can be obtained using an excess of sulfate ions.

Precipitation by hydroxide formation is the most common heavy metal precipitation method. The precipitation typically follows the reaction:

$$M^{+n} + nOH^- \leftrightharpoons M(OH)_n$$

Many heavy metals are amphoteric. Therefore their solubility reaches a minimum at a specific pH (different for each metal).

The addition of caustic materials is used to raise the pH. The most common caustics are:
sodium hydroxide (NaOH)
calcium hydroxide (Ca(OH)₂; lime)

Sodium hydroxide is more expensive than lime, and lime has the advantage of also acting as a coagulant during the precipitation/settling process, whereas NaOH does not. In addition, lime raises the SAR (soil absorptions ratio) of soils overcoming sodium salt buildup to assist in plant growth for phytoextraction, phytoremediation and phytostabilization. Lime also precipitates excess sulfates forming gypsum to assist in plant growth where sulfate levels are too elevated.

Many transition metals (e.g., Cd, Co, Cu, Fe, Hg, Ni, Zn) can form complexes with a number of different ligands such as hydroxides, sulfides, chlorides, cyanides, EDTA (ethylenediaminetetraacetic acid). If hydroxide precipitation is not adequate for heavy metal removal, other different ligands may be employed.

After neutralizing the sulfur dioxide/sulfites/bisulfites, and removing the heavy metal precipitates, the final high pH is then adjusted for phytoremediation, phytoextraction, or phytostabilization by plants, bacteria, and other organisms—usually at a pH range of approximately 6 to approximately 8. Other factors in the selection of this pH are the soil alkalinity in a region, and whether the treated wastewater will be land applied or discharged to an aqueous environment.

The reagents selected for heavy metals precipitation are thus selected not only for their affects on pH, but for their nutrient compositions to raise plants, bacteria, algae and photo biomass, all hereinafter referred to as "biomass". For example, where addition ammonia is required for fertilizer stimulation, ammonium hydroxide may be used to elevate pH for heavy metals precipitation, provided heavy metals precipitates, such as copper, have been previously removed. Phosphates may be added not only to precipitate heavy metals, such as lead, but to add additional fertilizer to the treated waters. Thus, the type of heavy metal also determines what type of plant nutrient is used for phytoextraction.

The treated conditioned water is then pH and SAR adjusted to promote the required plant growth.

Other plants are selected for phytostabilization of the sulfurous acid treated soils to prevent blowing and disturbance of these mined soils, while still others are selected for phytoremediation.

The invention thus provides a method for sulfurous acid leaching of heavy metals from soils into a contaminated water fraction for subsequent precipitation with alkaline and nutrient reagents for filtration removal to provide a metal free soil and reclaimed water suitable for raising crops and biomass and open stream discharge.

DESCRIPTION OF THE ILLUSTRATED EMBODIMENTS

As stated in Wikipedia, http://en.wikipedia.org/wiki/Mountaintop_removal,

"Mountaintop removal mining is a form of surface mining that involves the topographical alteration and/or removal of a summit, summit ridge, or significant portion of a mountain, hill, or ridge in order to obtain a desired geologic material.

The MTR process involves the removal of coal seams by first fully removing the overburden lying atop them, exposing the seams from above. This method differs from more traditional underground mining, where typically a narrow shaft is dug which allows miners to collect seams using various underground methods, while leaving the vast majority of the overburden undisturbed. The overburden waste resulting from MTR is either placed back on the ridge, attempting to reflect the approximate original contour of the mountain, and/or it is moved into neighboring valleys.

The process involves blasting with explosives to remove up to 400 vertical feet (120 m) of overburden to expose underlying coal seams. Excess rock and soil laden with toxic mining byproducts are often dumped into nearby valleys, in what are called "holler fills" or "valley fills."

MTR in the United States is most often associated with the extraction of coal in the Appalachian Mountains, where the United States Environmental Protection Agency (EPA) estimates that 2,200 square miles (5,700 $km^2$) of Appalachian forests will be cleared for MTR sites by the year 2012. Sites range from Ohio to Virginia. It occurs most commonly in West Virginia and Eastern Kentucky, the top two coal-producing states in Appalachia, with each state using approximately 1,000 tonnes of explosives per day for surface mining. At current rates, MTR in the U.S. will mine over 1.4 million acres (5,700 $km^2$) by 2010, an amount of land area that exceeds that of the state of Delaware.

Mountaintop removal has been practiced since the 1960s. Increased demand for coal in the United States, sparked by the 1973 and 1979 petroleum crises, created incentives for a more economical form of coal mining than the traditional underground mining methods involving hundreds of workers, triggering the first widespread use of MTR. Its prevalence expanded further in the 1990s to retrieve relatively low-sulfur coal, a cleaner-burning form, which became desirable as a result of amendments to the U.S. Clean Air Act that tightened emissions limits on high-sulfur coal processing.

The Process

Figure 1:
FIG. 1 is a US EPA diagram of an example of mountaintop mining of a coal deposit with a topography as shown.

FIG. 1 is a US EPA diagram of an example of mountaintop mining of a coal deposit with a topography as shown.

Figure 2:
FIG. 2 shows Step 1 where layers of rock and dirt above the coal (called overburden) are removed, and filled in the valley.

FIG. 2 shows Step 1 where layers of rock and dirt above the coal (called overburden) are removed, and filled in the valley.

Figure 3:
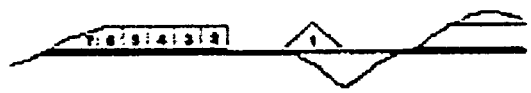
FIG. 3 shows Step 2 where the upper seams of coal are removed with spoils placed in an adjacent valley.

FIG. 3 shows Step 2 where the upper seams of coal are removed with spoils placed in an adjacent valley.

Figure 4:
FIG. 4 shows Step 3 where draglines excavate lower layers of coal with spoils placed in spoil piles.

FIG. 4 shows Step 3 where draglines excavate lower layers of coal with spoils placed in spoil piles.

Figure 5:
FIG. 5 shows Step 4 where regrading begins as coal excavation continues.

FIG. 5 shows Step 4 where regrading begins as coal excavation continues.

Step 5. Once coal removal is complete, final regrading takes place and the area is revegetated.

Land is deforested prior to mining operations and the resultant lumber is either sold, or burned. According to the Surface Mining Control and Reclamation Act of 1977 (SMCRA), the topsoil is supposed to be removed and set aside for later reclamation. However, coal companies are often granted waivers and instead reclaim the mountain with "topsoil substitute." The waivers are granted if adequate amounts of topsoil are not naturally present on the rocky ridge top. Once the area is cleared, miners use explosives to blast away the overburden, the rock and subsoil, to expose coal seams beneath. The overburden is then moved by various mechanical means to areas of the ridge previously mined. These areas are the most economical area of storage as they are located close to the active pit of exposed coal. If the ridge topography is too steep to adequately handle the amount of spoil produced then additional storage is used in a nearby valley or hollow, creating what is known as a valley fill or hollow fill. Any streams in a valley are buried by the overburden.

A front-end loader or excavator then removes the coal, where it is transported to a processing plant. Once coal removal is completed, the mining operators back stack overburden from the next area to be mined into the now empty pit. After back stacking and grading of overburden has been completed, topsoil (or a topsoil substitute) is layered over the overburden layer. Next, grass seed is spread in a mixture of seed, fertilizer, and mulch made from recycled newspaper. Depending on surface land owner wishes the land will then be further reclaimed by adding trees if the pre-approved post-mining land use is forest land or wildlife habitat. If the land owner has requested other post-mining land uses the land can reclaimed to be used as pasture land, economic development or other uses specified in SMCRA.

Because coal usually exists in multiple geologically stratified seams, miners can often repeat the blasting process to mine over a dozen seams on a single mountain, increasing the mine depth each time. This can result in a vertical descent of hundreds of extra feet into the earth."

The above process generates dust, blasting powder residues, and redistributes soils with heavy metals, which can enter streams and the water table.

Figure 6:
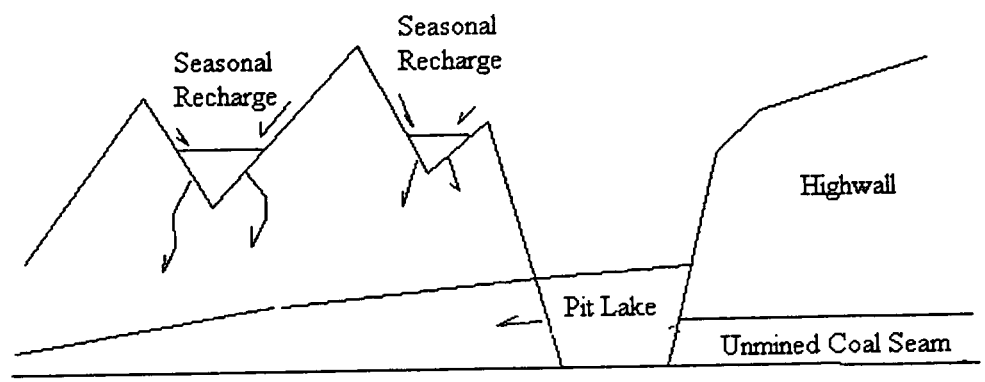
FIG. 6 is a schematic view of the method of the invention addressing remediation of coal overburden from mountaintop removal mining.
Figure 7:
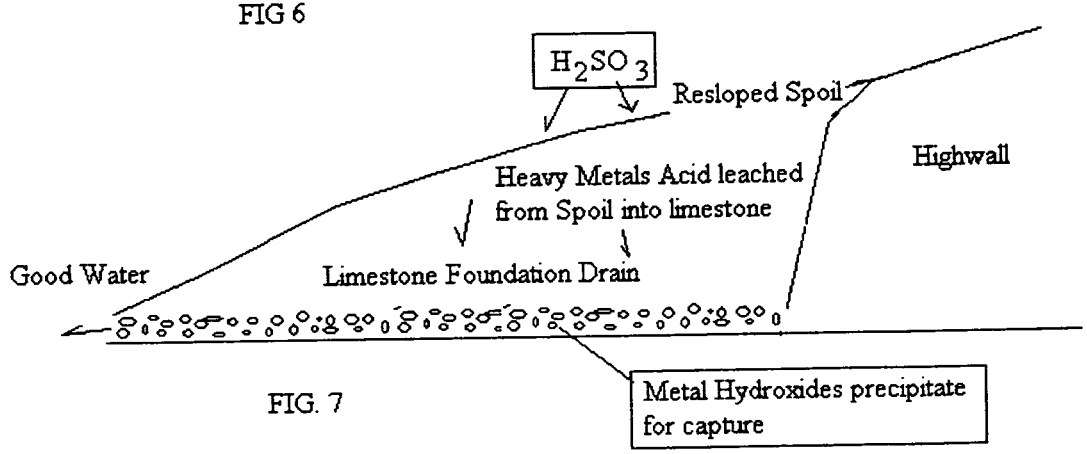
FIG. 7 is a schematic view of the method of the invention applied to remediate resloped spoil.

FIGS. 6 and 7 are schematic views of the method of the invention providing an example of the remediation of coal overburden from mountaintop removal mining.

FIG. 7 shows the resloped spoil wherein to prevent ponding of seasonal recharge, and the controlled application of sulfurous acid to the spoil to acid leach the heavy metals into a limestone foundation drain to precipitate and separate out the heavy metal precipitates. The sulfurous acid also keeps dust down and reduces blasting residues in the spoils so that they don't contaminate the water table.

The good water is then further filtered and used for phytoremediation/phytoextraction/phytostabilization further polishing (not shown).

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

I claim:

1. A hybrid chemical/phytoextraction/phytoremediation/ phytostabilization method for cleaning up heavy metals, perchlorates, and oxidizing compounds in contaminated soil and water comprising:
   a. exposing the contaminated soil and water to sufficient sulfurous acid, bisulfites/sulfites, and free $SO_2$ to reduce perchlorates, chromium VI, and oxidizing compounds such as blasting residues, acid leach heavy metals from soils into the water, and self agglomerate solids for separation;
   b. removing agglomerated solids from the water;
   c. adding sufficient complexing agents to the water to precipitate heavy metals for separation, and provide nutrients to aid plants, bacteria, and other photo biomass in phytoremediation, phytoextraction, and phytostabilization;
   d. filtering the heavy metal precipitates from the water, leaving metal free filtrate with nutrients;
   e. adjusting the pH to that required for applying the metal free filtrate with nutrients to plants, bacteria, and other photo biomass for phytoremediation, phytoextraction, and phytostabilization of contaminated soils.

2. A hybrid chemical/phytoextraction/phytoremediation/ phytostabilization method for cleaning up heavy metals and oxidizing compounds in contaminated soil and water according to claim 1, wherein the complexing agent is lime.

3. A hybrid chemical/phytoextraction/phytoremediation/ phytostabilization method for cleaning up heavy metals and oxidizing compounds in contaminated soil and water according to claim 1, wherein the complexing agents are ammonia hydroxide and phosphate solutions.

4. A hybrid chemical/phytoextraction/phytoremediation/ phytostabilization method for cleaning up heavy metals and oxidizing compounds in contaminated soil and water according to claim 1, wherein the type of photo biomass and bacteria is selected to remove heavy metals.

5. A hybrid chemical/phytoextraction/phytoremediation/ phytostabilization method for cleaning up heavy metals and oxidizing compounds in contaminated soil and water according to claim 1, wherein the metal free filtrate is used for dust control.

6. A hybrid chemical/phytoextraction/phytoremediation/ phytostabilization method for cleaning up heavy metals and oxidizing compounds in contaminated soil and water according to claim 1, wherein the pH of the sulfurous acid is selected to promote the growth of acid leaching bacteria, which remove heavy metals.

7. A hybrid chemical/phytoextraction/phytoremediation/ phytostabilization method for cleaning up heavy metals and oxidizing compounds in contaminated soil and water according to claim 1, wherein the pH for precipitating heavy metal hydroxides is sequentially adjusted for sequential precipitation and filtration of different heavy metal hydroxides.

\* \* \* \* \*